(12) United States Patent
Jinnai et al.

(10) Patent No.: US 7,490,470 B2
(45) Date of Patent: Feb. 17, 2009

(54) METHOD FOR MANUFACTURING VARIABLE-THROAT EXHAUST TURBOCHARGER AND CONSTITUENT MEMBERS OF NOZZLE THROAT AREA VARYING MECHANISM

(75) Inventors: Yasuaki Jinnai, Sagamihara (JP); Hiroshi Nakagawa, Sagamihara (JP); Isamu Inamura, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 13 days.

(21) Appl. No.: 11/324,258

(22) Filed: Jan. 4, 2006

(65) Prior Publication Data

US 2006/0168959 A1 Aug. 3, 2006

(30) Foreign Application Priority Data

Jan. 31, 2005 (JP) ............... 2005-022995

(51) Int. Cl.
*F02D 23/00* (2006.01)
*F04D 29/44* (2006.01)
*F01D 17/14* (2006.01)
*B21K 25/00* (2006.01)
*B21D 53/78* (2006.01)

(52) U.S. Cl. .................. 60/602; 415/160; 415/163; 29/889.2; 29/889.22

(58) Field of Classification Search ............ 60/602; 415/159–164, 191; 29/889.2, 889.22
See application file for complete search history.

(56) References Cited

U.S. PATENT DOCUMENTS

| | | | |
|---|---|---|---|
| 4,659,295 A | 4/1987 | Burdette et al. | 417/407 |
| 4,804,316 A | 2/1989 | Fleury | 417/407 |
| 4,836,747 A * | 6/1989 | Hotz | 415/163 |
| 5,116,197 A * | 5/1992 | Snell | 415/126 |
| 7,001,142 B2 * | 2/2006 | Knauer et al. | 415/160 |
| 2001/0017032 A1 | 8/2001 | Jinnai | 415/160 |
| 2002/0136630 A1 | 9/2002 | Jinnai et al. | 415/1 |
| 2004/0261413 A1 | 12/2004 | Nishiyama et al. | 60/602 |
| 2006/0034684 A1 | 2/2006 | Metz et al. | 415/191 |

FOREIGN PATENT DOCUMENTS

| | | | | |
|---|---|---|---|---|
| EP | 1 120 546 A2 | 8/2001 | | |
| EP | 1 245 307 A2 | 10/2002 | | |
| EP | 1 536 103 A1 | 6/2005 | | |
| JP | 59-78983 | 5/1984 | ............... | 156/60 |
| JP | 4-309455 | 11/1992 | | |
| JP | 7-236968 | 9/1995 | | |
| JP | 7-308775 | 11/1995 | | |
| JP | 2002038967 A * | 2/2002 | | |
| JP | 2002-285804 | 10/2002 | | |
| SU | 821549 * | 3/1980 | | |

* cited by examiner

*Primary Examiner*—Thai-Ba Trieu
(74) *Attorney, Agent, or Firm*—Wenderoth, Lind & Ponack, L.L.P.

(57) ABSTRACT

An exhaust turbocharger equipped with a nozzle throat area varying mechanism can be provided in which brazing welding is achieved with a small number of man-hour and at low cost, and which is stable in quality without danger of fracture of brazing-welded parts of constituent members. The variable-throat exhaust turbocharger equipped with a nozzle throat area varying mechanism for varying the blade angle of a plurality of nozzle vanes supported rotatably by members including turbine casing, is characterized in that members having at least one through-hole with at least one shaft member to be inserted into the through-hole(s) to be fixed therein among constituent members of the nozzle throat area varying mechanism are connected by means of brazing welding.

8 Claims, 5 Drawing Sheets

METHOD FOR MANUFACTURING VARIABLE-THROAT EXHAUST TURBOCHARGER AND CONSTITUENT MEMBERS OF NOZZLE THROAT AREA VARYING MECHANISM

BACKGROUND OF THE INVENTION

1. Field of the Invention

The present invention relates to a method for manufacturing a variable-throat exhaust turbocharger of an internal combustion engine. The turbocharger has a nozzle throat area varying mechanism (hereinafter called variable-throat mechanism) to vary the blade angle of a plurality of nozzle vanes rotatably supported by members in a turbine casing. The present invention also relates to a method for manufacturing constituent members of the variable-throat mechanism.

2. Description of the Related Art

In the field of exhaust turbochargers of internal combustion engines, particularly small ones used for internal combustion engines for vehicles, an exhaust turbocharger is disclosed in Japanese Laid-Open Patent Application No. 59-78983 (hereafter referred to as patent literature 1). The turbocharger is composed such that an exhaust turbine made of ceramic material which operates under high temperature and a compressor made of metal which operates under low temperature are connected by brazing welding.

In this exhaust turbocharger, the end portion of the shaft part of the ceramic turbine rotor is tapered, and a tapered hole is provided in the metal compressor wheel to be engaged tightly with the tapered portion of the turbine rotor. Depressed portions are provided on the surface of one or both of the tapered shaft portion and tapered hole so that when the tapered shaft portion is connected with the tapered hole, a medium of solder will fill the depressions. A highly accurate connection between the ceramic material and metal material is thereby realized, and the rigidity of connection between the ceramic turbine rotor and metal compressor wheel is increased by the mediacy of the solder.

In the field of exhaust turbochargers, particularly small ones used for an internal combustion engines for vehicles, a variable-throat exhaust turbocharger is equipped with a variable-throat turbine with which the flow rate of exhaust gas entering the turbine rotor through the scroll of the turbine casing can be varied. The rate is varied in accordance with operating conditions of the engine such that the exhaust gas flow matches the optimal operation condition of the turbocharger. The use of variable-throat turbochargers has spread widely in recent years.

In such a variable-throat turbocharger, among the constituent members of the variable-throat mechanism which vary the blade angle of a plurality of the nozzle vanes, drive pins are connected to a drive ring. The drive ring is engaged with a lever plate connected to the nozzle vanes by a plurality of nozzle shafts. A control sleeve engaged with the drive ring is connected to a lever linked to an actuator. These connections between the parts are usually made in such a way that the drive pins and the control sleeve, which are shaft members, are fixed to the drive ring and lever, which are members having a hole or holes, by means of welding or caulking.

There has been proposed in the patent literature 1, as mentioned above, a method of connecting a ceramic turbine rotor to a compressor wheel made of metal by brazing welding. However, as a method of connecting constituent members of an exhaust turbocharger, this connecting method has problems as described hereunder. Therefore, the method can not be applied to connecting constituent members of a variable-throat mechanism.

The method of connecting by brazing welding proposed in patent literature 1 is applied to connecting a compressor wheel to a turbine rotor to which high torque is loaded at high temperature. Depressions are provided on the surface of the tapered portion of the turbine rotor shaft and on the surface of the tapered hole of the compressor wheel to fill solder therein. If solder is filled imperfectly in the depressions, fracture may occur. Therefore, in the aforementioned method of connecting the turbine rotor to the compressor wheel, it is necessary for the brazing welding in the range of the depressions to be uniform and reliable, and it takes a good deal of processing hours to connect the turbine rotor to the compressor wheel by brazing welding.

Further, in connecting the turbine rotor to the compressor wheel, it is difficult to confirm infiltration and spreading of the solder to the far side range of the depressions toward the bottom of the hole in the compressor wheel. Consequently, it is difficult to detect defects in the connection, and stable quality of the turbocharger can not be maintained.

Therefore, the above discussed method of connecting by the brazing welding means of patent literature 1 is not appropriate for connecting constituent members of a variable-throat mechanism.

SUMMARY OF THE INVENTION

The object of the present invention is to provide an exhaust turbocharger equipped with a variable-throat mechanism in which brazing welding is achieved with a small number of man-hours and at low cost, and which provides stable quality without fracture of the brazing welding parts of the constituent members.

To attain the object, the present invention proposes a variable-throat exhaust turbocharger equipped with a variable-throat mechanism for varying the blade angle of a plurality of nozzle vanes. The nozzle vanes are supported rotatably by members including a turbine casing and the members have a through-hole or holes and a shaft member or members fixedly inserted into the through-hole or holes. The constituent members of the variable-throat mechanism are then connected by means of brazing welding.

In the invention, it is preferable for the connecting part of the through-hole and the shaft member to be formed such that the shaft member is inserted into the through-hole with an interference provided between the shaft and the hole at normal temperature. Also, it is preferable for a tapered portion to be formed at the entrance side of the hole to insert the shaft so that solder flows from the tapered portion toward the through-hole and so that the shaft member is fixed firmly in the through-hole.

Further, the invention proposes a method for manufacturing constituent members of the variable-throat mechanism of a variable-throat exhaust turbocharger. The variable throat turbocharger varies the blade angle of a plurality of nozzle vanes supported rotatably by members including a turbine casing. A tapered portion is formed at the entrance of the hole of a member having a through-hole or holes to insert a shaft member or members of the constituent members of the nozzle area varying mechanism. Also, a piece or pieces of solder are put on the conical taper face and the shaft member is inserted into the through-hole with an interference provided between the shaft and the hole at normal temperature. The shaft member is thereby integrated with the member having a through-hole or holes. The integrated member is then heated to a temperature of 1000° C.~1100° C. in a vacuum furnace so that the solder infiltrates into a small clearance created by the heating between the inside periphery of the hole and the outside periphery of the shaft. Then, the integrated member is cooled slowly and the shaft member or member are thereby fixed firmly to the member having a through-hole or holes.

It is preferable for the invention to be applied to any one of the connecting parts of a drive ring with drive pins or a control sleeve with a lever or both of them.

By attention to the brazing welding connection of the constituent members of the variable-throat mechanism, against which large torque is not exerted in comparison to power transmitting members, the reliable and simple method of the invention was made. According to the invention, a drive ring having through-holes and drive pins are constituent members of the variable-throat mechanism. The drive ring and drive pins can be firmly connected and fixed together very easily compared to the conventional art as disclosed in patent literature 1. Specifically, a piece or pieces of solder are put on a point or points on a circumferential face of a tapered portion formed at the entrance side of each of the through-holes of the drive ring. Then, the drive pins are inserted into the holes with an interference provided between the pin and hole at normal temperature. The integrated member formed by the drive ring and drive pins is then heated in the vacuum furnace to a high temperature of 1000° C.~1100° C.

By this method, brazing welding of the shaft member or members to the member having a through-hole or holes can be performed within a very small number of man-hours and at low cost.

The shaft member or members are fitted to the through-hole or holes of the member having a through-hole or holes with a piece or pieces of solder put on a point or points on the circumferential taper face at the entrance of the through hole or holes for inserting the shaft member or members. An integrated member of the member having a through-hole or holes and the shaft member or members is thereby obtained. Then the integrated member is heated in the vacuum furnace to a high temperature of 1000° C.~1100° C. The solder can then infiltrate into a clearance created by the heat between the inside periphery of the hole and the outside periphery of the shaft member. The solder spreads uniformly all over the clearance by only putting a piece or pieces of solder on a point or points on the circumferential face of the tapered portion. As a result, a very firm brazing connection can be achieved.

Further, as the drive pin is soldered in the through-hole, complete filtration of solder from the entrance side of the hole to the other side thereof can be easily confirmed. Thus, an integrated member having a defect in the brazed portion can be found easily and selected out and a stable quality of the member can be maintained.

Therefore, according to the invention, the integrated member consisting of the drive ring and the drive pins connected by means of brazing welding and having high connection rigidity can be obtained.

In the invention, it is preferable that each connecting part of the member having a through-hole or holes with the shaft member or members is configured such that a clearance gap or gaps is formed on the inside periphery of the through-hole. The gap or gaps preferably extend along the axial direction of the through-hole with a depth of 0.05~0.5 mm from the inside periphery of the through-hole for allowing solder to infiltrate into the clearance gap or gaps.

With this configuration, a small clearance may be created between the inside periphery of the through-hole of the member having a through-hole or holes and the outside periphery of the shaft member or members. Specifically, when the integrated member formed by the connection of the member having a through-hole or holes with the shaft member or members is heated to a high temperature in the vacuum furnace, the clearance may be too small because of a small difference in the coefficient of thermal expansion between them. Nonetheless, the solder can intrude into the clearance gap or gaps formed as a depression or depressions, respectively, from the inside periphery of the through-hole, and the solder can infiltrate evenly and all over between the inside periphery of the member having a through-hole or holes and the outside periphery of the shaft member or members. Therefore, even if there is a difference in the coefficient of thermal expansion between the member having a through-hole or holes and the shaft member, the connecting part between them can be brazed firmly and reliably.

When pressing the drive pin into the through-hole of the drive ring, high internal pressure is exerted on the through-hole, and scarring, cracks, or surface roughening may occur.

For example, when intending to secure enough interference for pressing-in or if the surface is treated by a surface treatment such as chromizing, the pressed-in surface may be influenced by the press-fit and become rough. Consequently, there arises a disadvantage from the viewpoint of strength. According to the invention, a clearance gap or gaps is provided for allowing solder to intrude into the clearance gap or gaps. Thus, the surface is not scratched and a strong connection can be achieved.

In the invention, it is preferable that the clearance gaps are semicircular grooves having a depth of 0.2~1 mm.

With this configuration, in a case that the coefficient of thermal expansion of the member having a through-hole or holes is very large and that of the shaft member is very small, the difference in coefficient of thermal expansion between the member having a through-hole or holes and the shaft member or members is large. Due to the large difference, tensile stress occurs at the soldered part when the integrated member is cooled after being heated to a high temperature. The tensile stress is eased by the presence of the semicircular clearance gap, and thus the fracture of the brazing welded part due to excessive tensile stress occurring at the soldered part is thereby prevented.

According to the present invention, shaft members such as drive pins are connected to a member having through-holes such as a drive ring. The connection of a shaft member such as the control sleeve to a member having a through-hole such as the lever, which are constituent members of a nozzle throat varying mechanism, can be made easily by the simple method of the present invention. A method according to the present invention includes putting a piece or pieces of solder on a point or points on the conical taper face provided at the entrance of the through-hole for inserting the shaft member. Then, the shaft member is inserted into the through-hole with an interference provided between the shaft and the hole at normal temperature, and then the integrated member formed of the member having a through-hole or holes and the shaft member or members is heated to a high temperature.

By this method, brazing welding of the shaft member or members to the member having a through-hole or holes can be performed within a very small number of man-hours and at low cost.

Further, the shaft member or members are fitted to the through-hole or holes of the member having a through-hole or holes with a piece or pieces of solder put on a point or points on the circumferential taper face at the entrance of the through-hole or holes for inserting the shaft member or members. An integrated member of the member having a through-hole or holes and the shaft member or members is thereby obtained. Then the integrated member is heated in the vacuum furnace to a high temperature of 1000° C.~1100° C. The solder can then infiltrate into a clearance created by the heat between the inside periphery of the through-hole and the outside periphery of the shaft member. The solder spreads uniformly all over the clearance by only putting a piece or pieces of solder on a point or points on the circumferential face of the tapered portion of the through-hole As a result, a very firm brazing connection can be achieved and a variable-throat mechanism, of which the strength of the connection of the brazing welded part is very high with stable quality, can be obtained.

BRIEF DESCRIPTION OF THE DRAWINGS

FIGS. 2A and 2B are representations of the first embodiment of the present invention.

FIGS. 7A and 7B show the fourth embodiment of the invention.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 1:
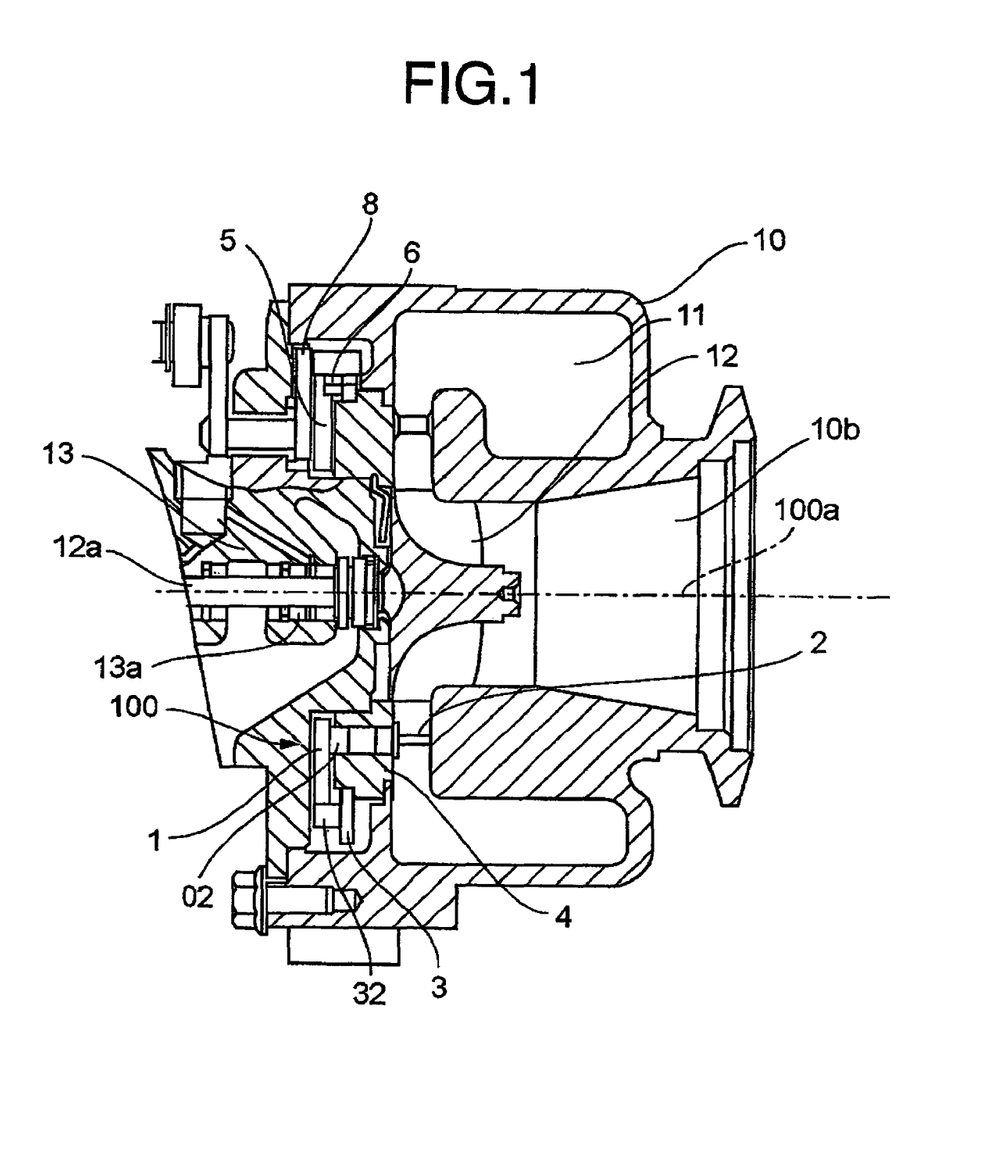
FIG. 1 is a longitudinal sectional view of a relevant part of a variable-throat exhaust turbocharger equipped with a variable-throat mechanism according to the present invention.

FIG. 1 is a longitudinal sectional view of a relevant part of a variable-throat exhaust turbocharger equipped with a variable-throat mechanism according to the present invention.

Referring to FIG. 1, reference numeral 10 is a turbine casing and 11 is a scroll chamber formed inside the turbine casing 10. Reference numeral 12 is a turbine rotor of the radial flow type, which is connected to a compressor wheel (not shown) coaxially and which is supported by the turbine shaft 12a for rotation by a bearing housing 13 by means of bearings 13a. Reference numeral 100a shows the center of rotation of the exhaust turbocharger.

Reference numeral 2 is a nozzle vane. Plural nozzle vanes are arranged circumferentially and equally spaced in an annular flow passage for exhaust gas formed in the inner side of the scroll chamber 11. A nozzle shaft 02 of each of the nozzle vanes is supported rotatably by a nozzle mount 4 fixed to the turbine casing 10 so that the blade angle of each nozzle vane 2 can be varied by means of a variable-throat mechanism.

Reference numeral 3 is a drive ring formed into an annular plate and supported rotatably on a part of the periphery of the nozzle mount 4. A plurality of drive pins 32 are fixed to the drive ring 3 and circumferentially equally spaced. Reference numeral 1 are lever plates each of which is engaged with the drive pin 32, a groove provided in an input side (outer side end part) the lever plate being engaged with drive pin 32. The nozzle shaft 02 is fixed to the output side (center side end part) thereof.

Reference numeral 8 is a crank mechanism connected to an actuator (not shown) which drives the nozzle vanes 2, 5 is a lever connected to the crank mechanism 8, and 6 is a control sleeve which is fixed to the lever 5 and engages with the drive ring 3 to rotate the drive ring 3.

In the variable-throat exhaust turbocharger with the variable-throat mechanism, exhaust gas of an internal combustion engine (not shown) enters the scroll chamber 11 and then enters the annular flow passage while swirling along the convolution of the scroll chamber 11. The exhaust gas flows through the spaces between the nozzle vanes to enter the turbine rotor 12 from the periphery thereof. The gas then flows in the radial direction toward the center and then out in the axial direction while exerting expansion work upon the turbine rotor 12. Then, the exhaust gas flowing out from the turbine rotor flows through the outlet passage 10b of the turbine casing and is exhausted outside.

When controlling exhaust gas flow through the exhaust turbine, the blade angle of the nozzle vanes 2 is determined by a blade angle control means (not shown) so that the flow rate of the exhaust gas flowing through the spaces between the nozzle vanes is a desired flow rate. The actuator (not shown) rotates the drive ring 3 to rotate the nozzle vanes 2 to the angle determined by the blade angle control means by way of the crank mechanism 8, lever 5, and control sleeve 6.

When the drive ring 3 is rotated, each lever plate 1 is swung around the center axis of each nozzle shaft 02, which is supported rotatably in the nozzle mount, by each of the drive pins 32. The drive pins are fixed to the drive ring 3 and spaced circumferentially equally. Each nozzle shaft 02 is fixed to a respective lever plate and rotated such that each nozzle vane 2 integral with a respective nozzle shaft 02 is rotated and thus, the blade angle of the nozzle vanes is varied.

The present invention relates to an improvement of the connection of the shaft members to the members having through-holes such as the connection of the drive pins to the drive ring and the connection of the control sleeve to the lever in the variable-throat exhaust turbocharger equipped with the variable-throat mechanism composed as described above.

First Embodiment

Figure 2A:
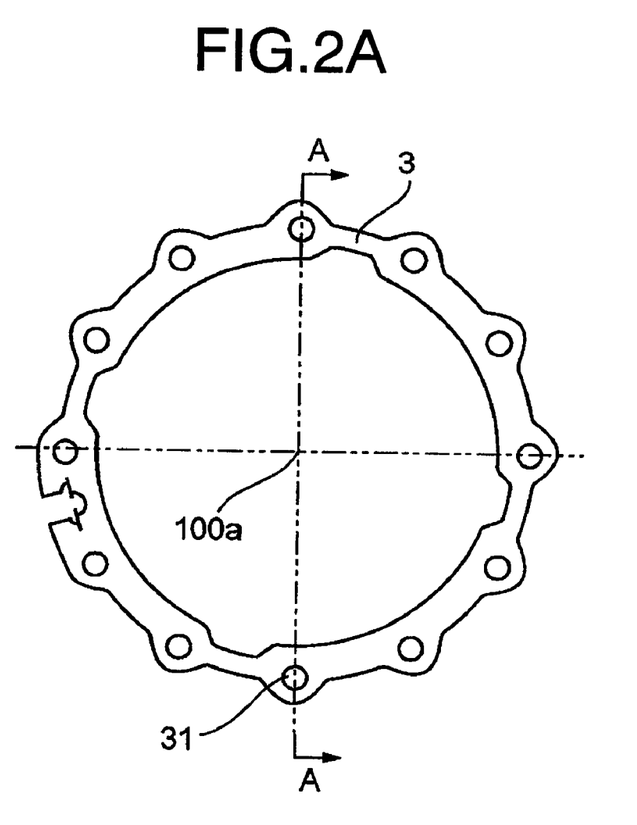
FIG. 2A is a front view of a drive ring.
Figure 2B:
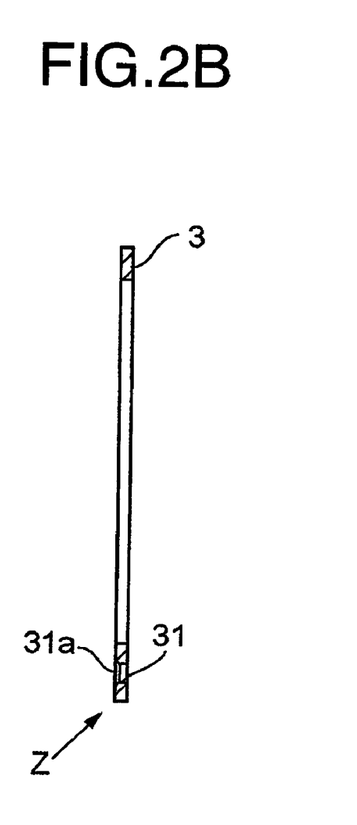
FIG. 2B is a sectional view taken along line A-A in FIG. 2A.
Figure 3:
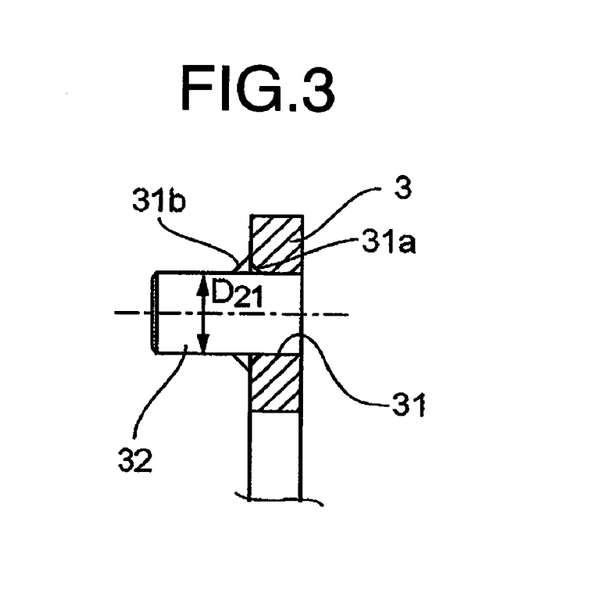
FIG. 3 is an enlarged sectional view showing the detail of the connecting part (corresponding to the part indicated by an arrow Z in FIG. 2B) of a drive pin with the drive ring of the first embodiment of the invention.

FIGS. 2A and 2B are representations of the first embodiment of the present invention, FIG. 2A is a front view of a drive ring, and FIG. 2B is a sectional view taken along line A-A in FIG. 2A. FIG. 3 is an enlarged sectional view showing the detail of the connecting part (corresponding to the part indicated by an arrow Z in FIG. 2B) of a drive pin with the drive ring of the first embodiment of the invention, and FIG. 4 is an enlarged front view of a through hole in the drive ring of the first embodiment.

Figure 4:
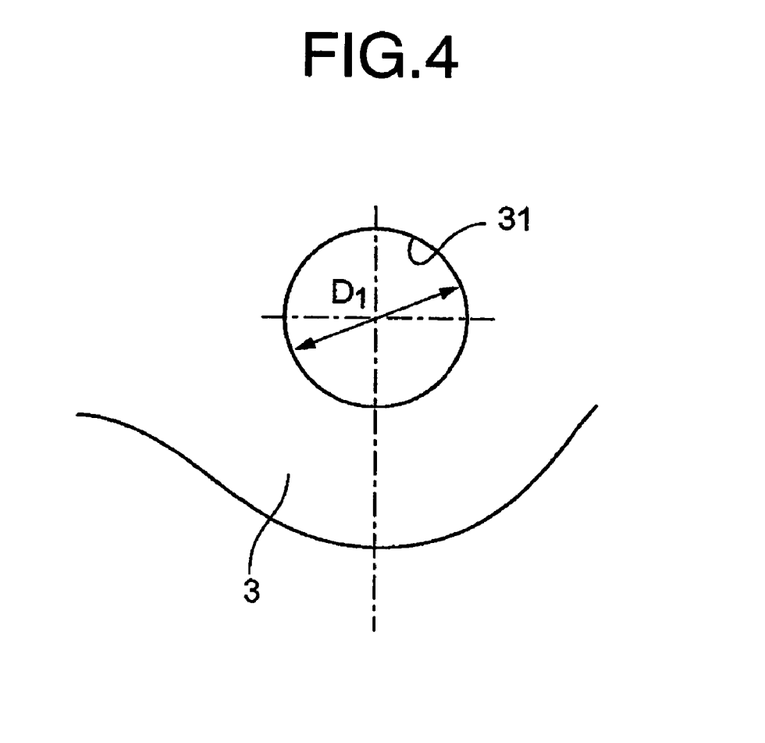
FIG. 4 is an enlarged front view of a through hole in the drive ring of the first embodiment.

Referring to FIGS. 2~4, reference numeral 3 is the drive ring (member having holes) of the variable-throat mechanism 100 (see FIG. 1), 31 are through-holes provided circumferentially equally spaced for receiving the drive pins 32. Each drive pin (shaft member) 32 is fixed to each of the through-holes 31 by brazing welding. A tapered portion 31a is formed at an end of the through-hole 31 for inserting the drive pin.

The method of connecting the drive pin 32 to the drive ring 3 in the first embodiment will be explained hereunder.

First, the through-hole 31 for receiving the drive pin 3 is drilled to be a perfect circle of diameter D1, then the tapered portion 31a is formed at the inlet side end of the through hole 31 for receiving the drive pin 32. A piece or pieces of solder 31b are put on a point or points on the circumferential surface of the tapered portion 31a, and the drive pin 32 is inserted into the hole 31 with an interference provided between the pin 32 and hole 31 at normal temperature (they are finished such that the diameter D21 of the pin 32 is slightly larger than the inside diameter D1 of the hole 31). By this, an integrated member of a drive ring 3 with drive pins 32 arranged circumferentially is obtained.

Then, the integrated member is heated in a vacuum furnace to 1000° C.~1100° C. The vacuum furnace is used for preventing the drive ring 3 and drive pins 32 from oxidizing.

By heating in the vacuum furnace to a high temperature, the inside diameter D1 of the through-hole 31 of the drive ring 3 becomes larger than the diameter D21 of the drive pin 32 and a very small clearance is created between the inside periphery of the hole 31 and the outside periphery of the drive pin 32. The solder 31b infiltrates from the tapered portion into the very small clearance.

Then, the integrated member is cooled slowly in the furnace to solidify the solder 31b and the drive pin 32 is thereby fixed firmly to the hole 31 of the drive ring 3.

As the drive ring 3 has already experienced high temperature when it is treated for chromizing and so on, there occurs no deterioration in material property due to the heat when brazing.

By attention to the brazing welding connection of the constituent members of the variable-throat mechanism 100, against which large torque is not exerted in comparison to power transmitting members, the reliable and simple method means of brazing welding of the invention was made. According to the first embodiment, the drive ring 3 having through-holes and drive pins 32 among constituent members of the variable-throat mechanism 100 can be firmly connected and fixed together very easily compared to the conventional art as disclosed in patent literature 1. Specifically, a piece or pieces of solder are put on a point or points on the circumferential face of the tapered portion 31a formed at the entrance side of the through-hole 31 of the drive ring 3. Then, the drive pins are inserted into the hole 31 with an interference provided between the pin 32 and hole 31 at normal temperature. Then, the integrated member of the drive ring 3 and drive pins 32 are heated in the vacuum furnace to a high temperature of 1000° C.~1100° C.

By this method, the brazing welding of the drive pins 32 to the drive ring 3 can be performed within a very small number of man-hours.

The drive pins 32 are fitted to the holes 31 of the drive ring 3 with a piece or pieces of solder put on a point or points on the face of the circumferential taper provided at the entrance of each of the holes 31 for inserting each of the pins 32. An integrated member of the drive ring with the drive pins is thereby obtained. Then, the integrated member is heated in a vacuum furnace to a high temperature of 1000° C.~1100° C. The solder 31b can then infiltrate into a clearance created by the heat between the inside periphery of the hole 31 and the outside periphery of the pin 32. The solder spreads uniformly all over the clearance by only putting a piece or pieces of solder on a point or points on the circumferential face of the tapered portion 31a. As a result, a very firm brazing connection can be achieved.

Further, as the drive pin 32 is soldered in the through-hole 31, complete infiltration of solder from the entrance side of the hole 31 to the other side thereof can be easily confirmed.

Therefore, an integrated member having a defect in the brazed portion can be found easily and selected out and a stable quality of the member can be maintained. Thus, the integrated member consisting of the drive ring 3 and the drive pins 32 connected by means of brazing welding, of which the strength of the connecting part is very high and the quality is stable, can be obtained.

Second Embodiment

Figure 5:
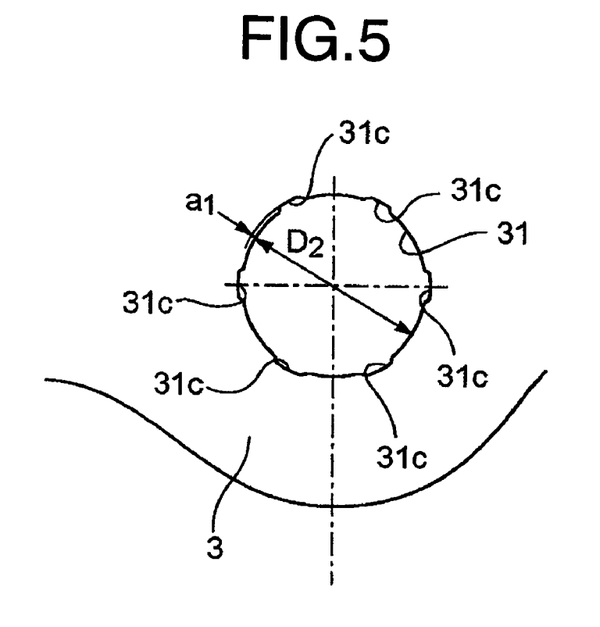
FIG. 5 is an enlarged front view of a through hole in the drive ring showing the second embodiment of the invention.

FIG. 5 is an enlarged front view of a through hole in the drive ring showing the second embodiment of the invention.

In the second embodiment, one or a plurality of clearance gaps 31c (six gaps in this example) are provided between the inside periphery (of which the inside diameter is D2) of the through-hole 31 of the drive ring 3 and the outside periphery of the drive pin 32. One or a plurality of depressions are provided on the inside periphery of the through-hole 31 to form gaps 31c for the solder to infiltrate. The depth $a_1$ of the clearance gap or gaps is 0.05~0.5 mm (preferably 0.05~0.1 mm).

According to the second embodiment, the clearance may be small between the inside periphery of the through-hole 31 and the outside periphery of the drive pin 32. Nevertheless, when the integrated member of the drive ring 3 with drive pins 32 is heated to a high temperature in the vacuum furnace, the small difference in coefficient of thermal expansion between the drive ring 3 and drive pin 32 allows the solder 31b to intrude into the clearance gap or gaps 31c depressed from the inside periphery of the through-hole 31 by a depth of $a_1$. Thus, the solder can infiltrate evenly all over between the inside periphery of the drive ring and the outside periphery of the drive pin 32. Therefore, even if the difference in the coefficient of thermal expansion between the drive ring 3 and drive pin 32 is small, the connecting part of the drive ring 3 to the drive pin 32 can be brazed firmly and reliably.

Third Embodiment

Figure 6:
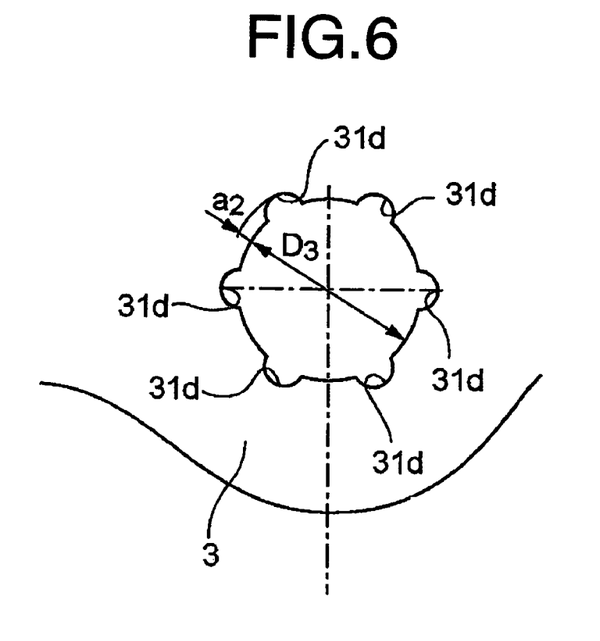
FIG. 6 is an enlarged front view of a through hole in the drive ring showing the third embodiment of the invention.

FIG. 6 is an enlarged front view of a through hole in the drive ring showing the third embodiment of the invention.

In the third embodiment, one or a plurality of clearance gaps 31d (six gaps in this example) are provided between the inside periphery (of which the inside diameter is D3) of the through-hole 31 of the drive ring 3 and the outside periphery of the drive pin 32. One or a plurality of semicircular grooves are provided on the inside periphery of the through-hole 31 to form gaps 31d for the solder to infiltrate. The depth $a_2$ of the clearance gap or gaps is 0.2~0.5 mm.

According to the third embodiment, the coefficient of thermal expansion of the drive ring 3 may be very large and that of the drive pin 32, very small. Thus, the difference between the coefficient of thermal expansion of the drive ring 3 and the drive pin 32 is large. The tensile stress which therefore occurs at the soldered part when the integrated member is cooled after being heated to a high temperature is eased by the presence of the semicircular clearance gap 31d. Thus, the fracture of the brazing welded part due to excessive tensile stress occurring at the soldered part is thereby prevented.

Fourth Embodiment

Figure 7A:
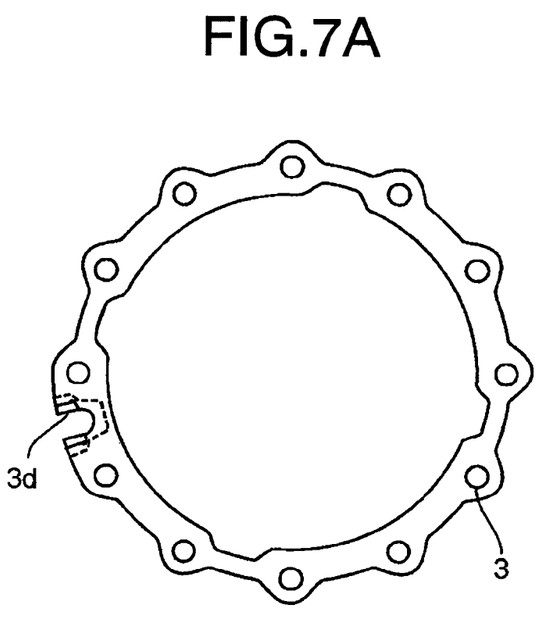
FIG. 7A is a front view of the drive ring.
Figure 7B:
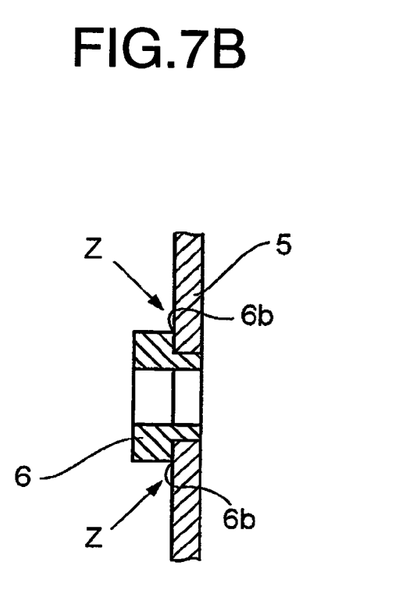
FIG. 7B is an enlarged sectional view showing the detail of the connecting part of a control sleeve with a lever.

FIGS. 7A and 7B show the fourth embodiment of the invention. FIG. 7A is a front view of the drive ring, and FIG. 7B is an enlarged sectional view showing the detail of the connecting part of a control sleeve with a lever.

In the fourth embodiment, the lever 5 is connected to the crank mechanism 8 linked to the actuator (not shown) and to the control sleeve 6 engaged with the drive ring 3 at a groove 3*d* provided at a peripheral part of the drive ring 3 to rotate the drive ring 3. The connection of the lever 5 is made by fixing the control sleeve 6 to the lever 5 by means of brazing welding in a manner similar to that of the first embodiment (except that the tapered portion of the first embodiment is not provided in this fourth embodiment).

In FIG. 7B, brazing welding part is designated by symbols 6*b* as indicated by arrows Z.

Action and effect of the fourth embodiment is similar to those of the first embodiment.

While the connection of the drive ring 3 with the drive pin 32 and the connection of the control sleeve 6 with the lever 5 are explained in the above embodiments, it is understood that the invention is not limited thereto or thereby. The invention is applicable to the connection of members having a through-hole or holes with a shaft member or members to be inserted into the hole or holes to be fixed therein among constituent members of variable-throat mechanism 100.

According to the present invention, brazing welding can be achieved within a small number of man-hours and at low cost, and an exhaust turbocharger equipped with a variable-throat mechanism can be provided which is stable in quality and without danger of fracture of brazing-welded parts of constituent members.

The invention claimed is:

1. A method for manufacturing a variable-throat exhaust turbocharger having a nozzle throat area varying mechanism and a turbine casing within which a plurality of nozzle vanes are disposed and also having a plurality of members rotatably supporting the plurality of nozzle vanes, the plurality of members including a member having at least one through-hole and also including at least one shaft member, the method comprising:

forming a conically tapered portion at an entrance of the at least one through-hole;

putting a piece of solder on the tapered portion;

inserting the at least one shaft member into the through-hole with an interference provided between the at least one shaft member and the member having the at least one through-hole;

heating the integrated member formed of the at least one shaft member and the member having at least one through-hole in a vacuum furnace to a temperature of 1000-1100 degrees Celsius such that the piece of solder infiltrates into a small clearance between the member having at least one through-hole and the shaft member; and cooling the integrated member slowly to thereby firmly fix the at least one shaft member to the member having at least one through-hole.

2. The method of claim 1, wherein
the member having at least one through-hole is a drive ring with a plurality of through-holes and the at least one shaft member is a plurality of drive pins of the nozzle throat area varying mechanism.

3. A variable-throat exhaust turbocharger including:
a turbine casing; and a nozzle throat area varying mechanism for varying a blade angle of a plurality of nozzle vanes that are rotatably supported in said turbine casing;

wherein said nozzle throat area varying mechanism comprises constituent members, including a drive ring for controlling the varying of the blade angle of said plurality of nozzle vanes, drive pins connected to said drive ring for engaging lever plates connected to nozzle shafts of said nozzle vanes, a lever engaging with said drive ring and a control sleeve fixed to said lever;

wherein said drive ring and said lever comprise through-holes, and said drive pins and said control sleeve form shaft members inserted and fixed into said through-holes of said drive ring and said lever, respectively, so as to form respective connecting parts; and wherein at least one of said connecting parts is connected together by brazing welding.

4. A variable-throat exhaust turbocharger including:
a turbine casing; and
a nozzle throat area varying mechanism for varying a blade angle of a plurality of nozzle vanes that are rotatably supported in said turbine casing;

wherein said nozzle throat area varying mechanism comprises constituent members, including a member having at least one through-hole and at least one shaft member inserted and fixed into said at least one through-hole, respectively, which have a clearance created between the inside periphery of said through-hole and the outside periphery of said shaft member in a state in which said shaft member is inserted into said through-hole such that the solder infiltrates into said clearance and said at least one through-hole and said at least one shaft member are connected together by brazing welding to form a connecting part between said at least one through-hole and said at least one shaft member; and wherein said connecting part between said at least one through-hole and said at least one shaft member is one or more of (a) a connecting part between a drive ring and drive pins and (b) a connecting part between a control sleeve and a lever.

5. A variable-throat exhaust turbocharger according to claim 4, further comprising:
a clearance gap for allowing solder to infiltrate between said at least one through-hole and said shaft member, said clearance gap extending axially of and within said through-hole between said drive ring and said drive pin and having a depth of 0.05 mm to 0.5 mm.

6. A variable-throat exhaust turbocharger according to claim 5, wherein
said clearance gap is a semicircular groove having a depth of 0.2 mm to 0.5 mm.

7. The variable-throat exhaust turbocharger of claim 4, wherein:
said member having at least one through-hole comprises said drive ring having a plurality of through-holes; and
said at least one shaft member comprises said drive pins.

8. The variable-throat exhaust turbocharger of claim 4, wherein:
said member having at least one through-hole comprises said control sleeve; and
said at least one shaft member comprises said lever.

* * * * *